July 18, 1939.   J. F. PUTNAM ET AL   2,166,370
LIQUID FLOW CONTROL APPARATUS
Filed April 6, 1938
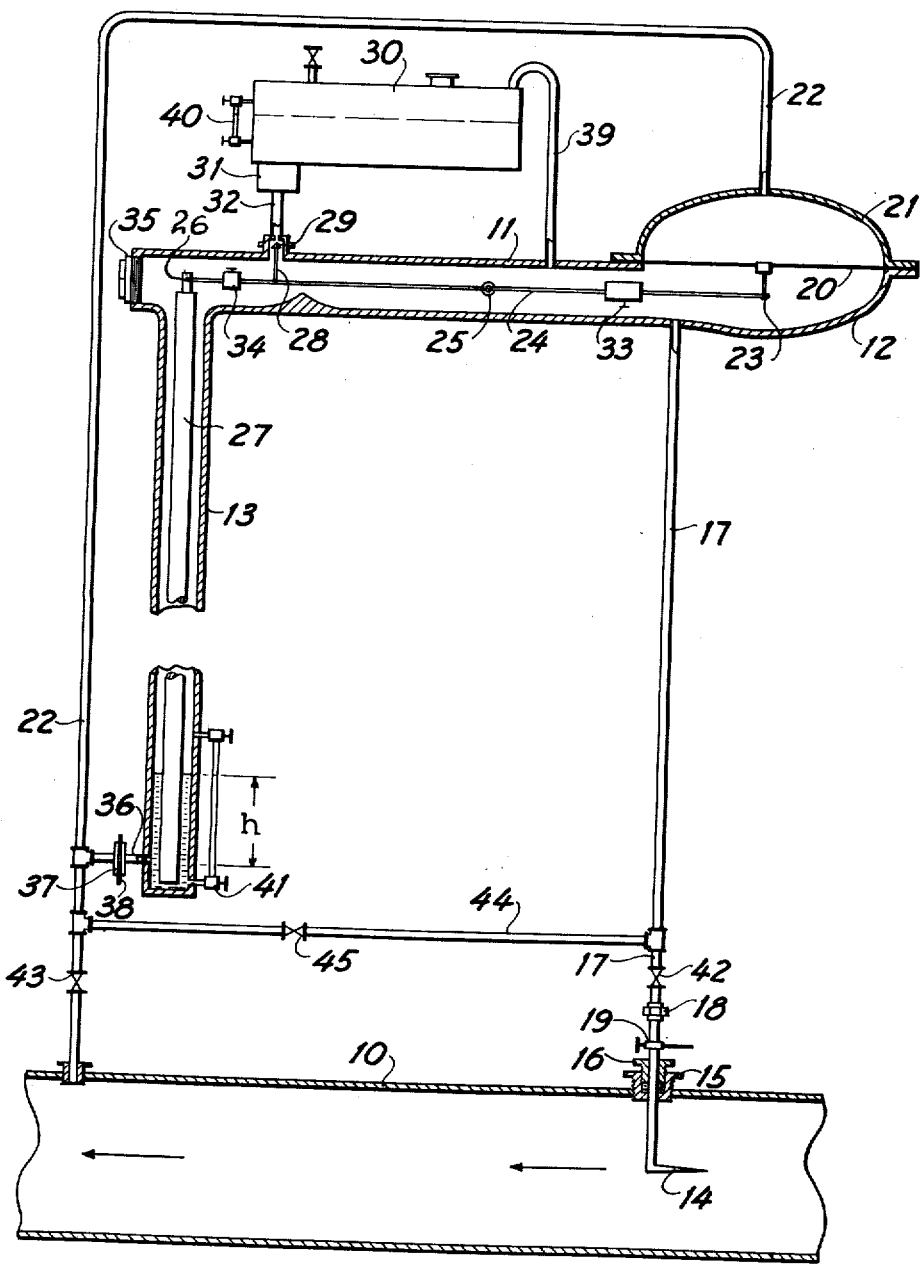
Eldred E. Edwards
Joseph F. Putnam
INVENTORS
BY *J. N. Adams*
ATTORNEY Patented July 18, 1939

2,166,370

UNITED STATES PATENT OFFICE 2,166,370

LIQUID FLOW CONTROL APPARATUS

Joseph F. Putnam, Berkeley, and Eldred E. Edwards, Walnut Creek, Calif., assignors to Standard Oil Company of California, San Francisco, Calif., a corporation of Delaware Application April 6, 1938, Serial No. 200,396

7 Claims. (Cl. 137—68)

This invention relates to fluid feeding devices, and particularly to one which is adapted to utilize a very small variation in pressure differential and to amplify such variations to actuate a liquid flow control means.

In the natural gas industry the problem has arisen of introducing an odorant material, usually a volatile liquid, into the normally odorless gas so as to give the latter a distinct and easily recognizable odor to reveal the presence of leaks, accidentally extinguished burners and the like. The gas is usually confined in a pipe or conduit at a pressure which may range from substantially atmospheric to several hundred pounds per square inch. Rates of flow of the gas may be variable, ranging from practically no flow to a large maximum at times of peak demand. Heretofore, apparatus for introducing odorant liquid into gas lines has required that an obstruction be placed in the line so as to produce a differential ranging up to 100 inches of water in order to control the odorant flow. It is often inconvenient to install an orifice of similar construction in the gas line to produce such a high differential pressure, and it sometimes happens that pressure conditions in the line will not admit of so high a pressure drop.

It is an object of this invention to provide a sensitive differential fluid pressure responsive device which is adapted to operate upon very small pressure differentials, which has a minimum of moving parts and which is also adapted to amplify variations in what pressure differential is used to actuate directly a positive liquid flow control means such as a valve, which in turn will control the liquid head above an orifice and thus regulate the rate of liquid flow therethrough.

Another object is to provide a device of this type which is entirely self-contained and which requires no outside power supply for its continued operation.

Another object is to provide a device of this type which will automatically stop the flow of liquid when the pressure different falls to zero.

These and other objects and advantages will become apparent from the description which follows and from the accompanying drawing which forms a part of this specification and illustrates a preferred embodiment of the invention as applied to an odorant feeding device for a natural gas line.

In the drawing, the figure is a vertical and part sectional view on the longitudinal axis of a liquid flow control device in place on a gas line.

Referring to the drawing, reference numeral 10 represents a gas main through which natural gas or another gas which is to be odorized is passing in the direction shown by the arrows. The odorizer itself comprises a housing 11 enlarged at one side to form a diaphragm chamber 12 and provided with a depending float tube 13 for a purpose which will be explained below.

A Pitot tube 14 is mounted in gas line 10 and is adapted to be responsive to the velocity of the gas passing through the line. Under certain circumstances, this velocity may be so high that the normal compensation means in the odorizer body will not compensate for the differential pressure which such velocities will produce. In such cases, Pitot tube 14 may be made rotatable as indicated, passing through a threaded bushing 15 and a stuffing box 16, and being connected to pipe 17 by means of a union or similar means 18. An indicator 19 is preferably secured to the Pitot tube to indicate the direction of its nozzle. By this arrangement, velocities which are too high for normal operation may be successfully used to control this device if the nozzle of Pitot tube 14 is directed at a slight angle to the longitudinal axis of the gas line 10.

The differential pressure produced by the velocity of the gas against Pitot tube 14 is transmitted into diaphragm chamber 12 through line 17. Chamber 12 is provided with a flexible diaphragm 20 which may be secured by a flanged cover 21. A low pressure connection 22 leads from a point above a diaphragm 20 into gas main 10, and also serves as a conduit for the introduction of the odorant in a manner which will be described below.

Diaphragm 20 is pivotally connected at 23 to one end of a long lever 24 which is pivoted at 25 at a point intermediate the housing 11. At the opposite end 26 of lever 24 is pivoted a downwardly depending metal rod or float 27, preferably of a light material such as aluminum. Intermediate pivot 25 and point 26 a link 28 is adapted to actuate a float valve 29, which valve controls the rate of flow of liquid odorant from an odorant supply tank 30. A suitable strainer 31 in line 32 prevents foreign material from interfering with the operation of valve 29.

Counterweights 33 and 34 on lever 24 serve to adjust the relation between the differential pressure exerted upon diaphragm 20 due to the velocity of gas in line 10 and the buoyant effect of float 27. A plug 35 in housing 11 permits access to weights 33 and 34.

When diaphragm 20 is deflected by the pressure differential existing between the upper and lower compartments of diaphragm chamber 12, lever 24 will be moved to open valve 29 and permit odorant from tank 30 to flow into housing 11 and to accumulate in depending float tube or chamber 13. When the odorant is accumulated in vertical tube 13 until it has buoyed up rod 27, that rod will rise and cause valve 29 to stop further flow of odorant into the device. Because of the large area of diaphragm 20 and the relatively low buoyancy of rod 27, a considerable head of liquid $h$ will accumulate in the lower end of float tube 13 with a very small differential in pressure between opposite sides of the diaphragm. This will provide in effect an amplifying means so that small changes in differential pressure set up by the gas velocity against Pitot tube 14 will produce relatively large and proportional changes in the height $h$ of the liquid head in float tube 13.

At a point near the lower end of float tube 13, a side outlet connection 36 leads from the inside of float tube 13 to conduit 22. A pair of flanges 37 in this connection provides a holding means for an orifice disc 38 through which odorant may flow from tube 13 into conduit 22 and thence into gas main 10 under the influence of head $h$, plus whatever small differential pressure is imposed upon the surface of the odorant by the Pitot tube 14. In order to equalize the pressure on the odorant in tank 30, a pressure connection 39 leads from housing 11 of the device into tank 30 at a point above the liquid level therein. If desired, a gage glass 40 will indicate the level of liquid in storage tank 30. In order to facilitate adjustment of the apparatus, a gage glass 41 may be provided at the lower end of tube 13 in order to indicate the level of the odorant liquid therein. For the same purpose, shut-off valves 42 and 43 may be provided in lines 17 and 22 respectively, and those lines may be connected by a by-pass 44 provided with a valve 45.

In operation and for the initial adjustment of the device, valves 42 and 43 are closed and valve 45 in by-pass 44 is opened, thus equalizing the pressure on both sides of diaphragm 20. Weights 33 and 34 are then adjusted until sufficient odorant has run into float tube 13 to lift float 27 and to stand at a point just below the level of connection 36 and orifice 38. Valve 45 is then closed and valves 42 and 43 are opened, thus placing the apparatus in position for operation. The velocity of gas against Pitot tube 14 causes a higher pressure below diaphragm 20 than that which is above the diaphragm. This will urge diaphragm 20 upwardly and float 27 downwardly, opening valve 29 and permitting odorant to flow into float tube 13, thus increasing the head $h$ on odorant orifice 38 and starting flow of odorant therethrough. The additional head of liquid caused by the pressure differential will be proportional to the square of the gas velocity in line 10. The amount of liquid odorant passing through orifice 38 into the gas line 10 will be proportional to the square root of the height of liquid above the orifice, and therefore will be directly proportional to the quantity of gas flow through the pipe line. By means of this diaphragm-float combination, the liquid head $h$ will be greater than the velocity head set up in the pitot tube by the ratio of the diaphragm area to the float area. The total head on the orifice will be equal to the liquid head plus the small differential set up by the Pitot tube 14.

When the gas flow in line 10 decreases, diaphragm 20 will be deflected downwardly, thus positively shutting off valve 29 and preventing further flow of odorant into float tube 13. That odorant liquid that is already in tube 13 will pass through orifice 38 until the buoyancy of float 27 has been decreased to a point where it will balance the new pressure differential on diaphragm 20, after which valve 29 will be opened in the manner just mentioned to maintain that odorant height and odorant flow at the proper values. By making float 27 only slightly smaller in diameter than the inside of tube 13, this added quantity of odorant will not seriously affect the proportioning of odorant to gas flow, and it will be found that this apparatus will give substantially proportional control of odorizing, within practical limits.

It will be appreciated that from the foregoing description one skilled in the art of hydraulics will be able to adapt this invention to any given set of conditions of gas flow, pressure and proportion of liquid flow rate to gas flow rate.

The essential features of this invention appear to reside in the provision of a liquid accumulating chamber, a restricted liquid outlet from the chamber, a displacement means in the chamber responsive to a pressure differential of relatively small magnitude as from a gas flow in a gas line acting upon a diaphragm, and means for admitting to the accumulating chamber a liquid, the level of said liquid being variable by the displacement means in the said chamber. In the case of an odorizer, the effective head of liquid above the restricted liquid outlet will be maintained proportional to a predetermined function of the differential pressure, normally the square of the gas velocity in the line. The amount of liquid odorant passing through the restricted liquid outlet into the gas line will be proportional to the square root of the height of liquid above that outlet, and therefore will be directly proportional to the quantity of gas flow through the pipe line.

Although a specific construction embodying this invention has been described and illustrated, it is to be understood that the invention is not limited to that specific device, and all such modifications and changes as come within the scope of the appended claims are embraced thereby.

We claim:

1. A liquid flow control apparatus of the type described, comprising a diaphragm, means for impressing a differential pressure on opposite sides of said diaphragm, a float chamber, a float in said chamber responsive to the position of said diaphragm, a liquid storage tank having an outlet, a valve in said outlet responsive to the position of said float to admit liquid into said chamber, and a restricted liquid outlet from said chamber, said float and diaphragm so constructed and arranged as to maintain a depth of liquid in said chamber proportional to a predetermined function of the differential pressure across said diaphragm.

2. A liquid flow control apparatus according to Claim 1 in which said means for impressing a differential pressure on opposite sides of said diaphragm comprises a Pitot tube disposed in a gas line and arranged to be responsive to the velocity of the gas flowing therein.

3. A liquid flow control apparatus comprising a housing, a diaphragm in said housing, means for connecting a source of differential pressure to opposite sides of said diaphragm, a float chamber in said housing, a float in said chamber, a linkage connecting said diaphragm and said float, a liquid storage tank having an outlet, a valve in said outlet responsive to the position of said linkage to admit liquid into said chamber and a restricted liquid outlet from said chamber.

4. A liquid flow control apparatus comprising a float chamber, a float in said chamber, differential pressure responsive means for controlling the position of said float, a liquid storage tank having an outlet, a valve in said outlet responsive to the position of said float to admit liquid into said chamber, and a restricted liquid outlet from said chamber, said float adapted to actuate said valve to maintain a depth of liquid in said chamber above said outlet proportional to a predetermined function of the differential pressure impressed on said differential pressure responsive means.

5. A liquid flow control apparatus according to claim 4, with the addition of means for indicating the level of liquid in said float chamber.

6. A liquid flow control apparatus according to claim 4 in which said pressure responsive means comprises a diaphragm of larger effective area than that of said float.

7. A liquid flow control apparatus comprising a liquid accumulating chamber, a restricted liquid outlet from said chamber, a displacement means in said chamber responsive to the level of liquid therein, a liquid storage tank having an outlet, flow restricting means in said liquid storage tank outlet responsive to the position of said displacement means to admit liquid into said chamber, and means responsive to a pressure differential for moving said displacement means to increase the liquid height in said chamber with an increase of differential pressure.

JOSEPH F. PUTNAM.
ELDRED E. EDWARDS.

CERTIFICATE OF CORRECTION.

Patent No. 2,166,370.     July 18, 1939.

JOSEPH F. PUTNAM, ET AL.

It is hereby certified that error appears in the printed specification of the above numbered patent requiring correction as follows: Page 1, first column, line 23, for the words "of similar construction" read or similar restriction; line 43, for "different" read differential; and that the said Letters Patent should be read with this correction therein that the same may conform to the record of the case in the Patent Office.

Signed and sealed this 5th day of September, A. D. 1939.

Henry Van Arsdale, (Seal)                        Acting Commissioner of Patents.

and a restricted liquid outlet from said chamber.

4. A liquid flow control apparatus comprising a float chamber, a float in said chamber, differential pressure responsive means for controlling the position of said float, a liquid storage tank having an outlet, a valve in said outlet responsive to the position of said float to admit liquid into said chamber, and a restricted liquid outlet from said chamber, said float adapted to actuate said valve to maintain a depth of liquid in said chamber above said outlet proportional to a predetermined function of the differential pressure impressed on said differential pressure responsive means.

5. A liquid flow control apparatus according to claim 4, with the addition of means for indicating the level of liquid in said float chamber.

6. A liquid flow control apparatus according to claim 4 in which said pressure responsive means comprises a diaphragm of larger effective area than that of said float.

7. A liquid flow control apparatus comprising a liquid accumulating chamber, a restricted liquid outlet from said chamber, a displacement means in said chamber responsive to the level of liquid therein, a liquid storage tank having an outlet, flow restricting means in said liquid storage tank outlet responsive to the position of said displacement means to admit liquid into said chamber, and means responsive to a pressure differential for moving said displacement means to increase the liquid height in said chamber with an increase of differential pressure.

JOSEPH F. PUTNAM.
ELDRED E. EDWARDS.

CERTIFICATE OF CORRECTION.

Patent No. 2,166,370. July 18, 1939.

JOSEPH F. PUTNAM, ET AL.

It is hereby certified that error appears in the printed specification of the above numbered patent requiring correction as follows: Page 1, first column, line 23, for the words "of similar construction" read or similar restriction; line 43, for "different" read differential; and that the said Letters Patent should be read with this correction therein that the same may conform to the record of the case in the Patent Office.

Signed and sealed this 5th day of September, A. D. 1939.

Henry Van Arsdale, (Seal) Acting Commissioner of Patents.